(12) United States Patent
Bi

(10) Patent No.: US 11,474,776 B2
(45) Date of Patent: Oct. 18, 2022

(54) DISPLAY-BASED AUDIO SPLITTING IN MEDIA ENVIRONMENTS

(71) Applicant: Intel Corporation, Santa Clara, CA (US)

(72) Inventor: Hang Bi, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/251,554

(22) PCT Filed: Dec. 18, 2018

(86) PCT No.: PCT/CN2018/121759
§ 371 (c)(1),
(2) Date: Dec. 11, 2020

(87) PCT Pub. No.: WO2020/124363
PCT Pub. Date: Jun. 25, 2020

(65) Prior Publication Data
US 2021/0311694 A1    Oct. 7, 2021

(51) Int. Cl.
*H04R 29/00*    (2006.01)
*G06F 3/16*    (2006.01)

(52) U.S. Cl.
CPC ........... *G06F 3/165* (2013.01); *H04R 29/001* (2013.01); *H04R 2499/15* (2013.01)

(58) Field of Classification Search
CPC ..................................................... H04R 29/00
See application file for complete search history.

(56) References Cited

U.S. PATENT DOCUMENTS 5,291,556 A * 3/1994 Gale ..................... G06F 3/16
381/17
10,154,149 B1    12/2018 Gean et al.
(Continued)

FOREIGN PATENT DOCUMENTS

CN    105635798 A    6/2016
CN    106341719 A    1/2017
(Continued)

OTHER PUBLICATIONS

Notification of Transmittal of the International Search Report and the Written Opinion of the International Searching Authority for PCT Application No. PCT/CN2018/121759 dated Aug. 28, 2019, 10 pages.
(Continued)

*Primary Examiner* — Olisa Anwah
(74) *Attorney, Agent, or Firm* — Jaffery Watson Mendonsa & Hamilton LLP

(57) ABSTRACT

A mechanism is described for facilitating display-based audio splitting in media environments, according to one embodiment. A method of embodiments, as described herein, includes receiving, at a computing device, a request to split audio streams associated with audio channels in communication with the computing device serving as a host device, wherein the audio streams are generated by one or more applications; selecting a split mode to facilitate splitting of the audio streams; and splitting the audio streams based on the split mode such that the audio streams are continuously mapped to the audio channels to adjust for delays and fine tuning.

14 Claims, 12 Drawing Sheets

(56) References Cited

U.S. PATENT DOCUMENTS

| | | | |
|---|---|---|---|
| 2006/0104223 | A1 | 5/2006 | Glatron et al. |
| 2011/0249819 | A1* | 10/2011 | Davis ............... H04S 5/005 381/17 |
| 2012/0311043 | A1* | 12/2012 | Chen ............ H04N 21/23406 709/204 |
| 2013/0243199 | A1 | 9/2013 | Kallai et al. |
| 2014/0009366 | A1* | 1/2014 | Chang ............... G09G 3/2092 345/1.1 |
| 2014/0133683 | A1* | 5/2014 | Robinson ............ H04S 7/305 381/303 |
| 2014/0301576 | A1* | 10/2014 | Lacorte ............ H04R 1/1041 381/120 |
| 2015/0023521 | A1 | 1/2015 | Jones et al. |
| 2015/0248468 | A1* | 9/2015 | Cheng ............... H04L 67/02 707/621 |
| 2017/0006331 | A1* | 1/2017 | Jairath ........... H04N 21/4344 |
| 2017/0188151 | A1 | 6/2017 | Veeramani et al. |
| 2017/0293465 | A1 | 10/2017 | Kotteri et al. |
| 2018/0350374 | A1* | 12/2018 | Butterworth ....... H04N 21/4398 |
| 2019/0045316 | A1* | 2/2019 | Schneider ............... H04S 7/30 |
| 2019/0075399 | A1* | 3/2019 | Nyegaard ............ H04S 1/005 |
| 2019/0215349 | A1* | 7/2019 | Adams ............... A63F 13/285 |
| 2020/0379942 | A1* | 12/2020 | Kakulamarri ...... G06F 13/4291 |

FOREIGN PATENT DOCUMENTS

| | | |
|---|---|---|
| EP | 3900373 A1 | 10/2021 |
| WO | 2012158165 A1 | 11/2012 |
| WO | 2015126814 A1 | 8/2015 |

OTHER PUBLICATIONS

Extended European Search Report for EP Application No. 18943771.8, dated Jul. 11, 2022, 9 pages.

* cited by examiner

DISPLAY-BASED AUDIO SPLITTING IN MEDIA ENVIRONMENTS

CLAIM OF PRIORITY

This application claims, under 35 U.S.C. § 371, the benefit of and priority to International Application No. PCT/CN2018/121759, filed Dec. 18, 2018, titled DISPLAY-BASED AUDIO SPLITTING IN MEDIA ENVIRONMENTS, the entire content of which is incorporated herein by reference.

FIELD

Embodiments described herein relate generally to data processing and more particularly to facilitate display-based audio splitting and synchronization in audio/video environments.

BACKGROUND

Conventional techniques provide for speakers that are embedded in display devices, such as monitors, televisions, tablet computers, smartphones, etc. Most of such devices posses the ability to communicate display audio streams to their users through various interfaces (e.g., high-definition multimedia interface (HDMI)). However, conventional techniques are severely limited in their performance as they fail to recognize the independence of each of the multiple audio streams associated with their corresponding multiple displays.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
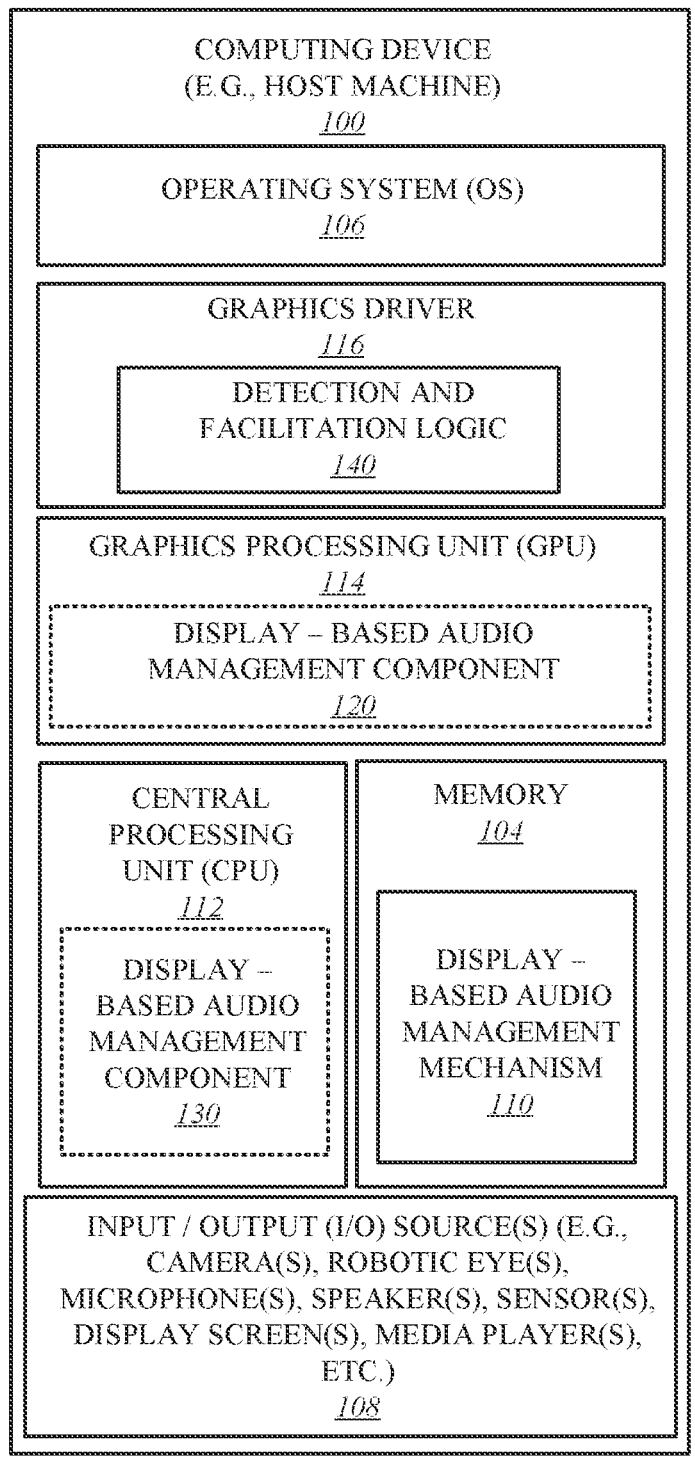
FIG. 1 illustrates a computing device employing a display-based audio management mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for recognizing multiple audios associated with multiple display devices and realizing that each audio stream corresponding to a display device is independent other audio streams corresponding to other display devices. Embodiments further provide for splitting and then mapping of audio channels along with managing and synchronizing of audio streams associated with the split audio channels.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent".

For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a display-based audio management mechanism ("audio management mechanism") 110 according to one embodiment. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc. Computing device 100 represents a communication and data processing device including or representing (without limitations) a computing device (VED), a voice command device (VCD), and/or the like.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Computing device 100 includes or works with or is embedded in or facilitates any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc. Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, or the like, as well as input/output (I/O) source(s) 108, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, audio management mechanism 110 may be hosted by memory 104 in communication with I/O source(s) 108, such as microphones, speakers, etc., of computing device 100. In another embodiment, audio management mechanism 110 may be part of or hosted by operating system 106. In yet another embodiment, audio management mechanism 110 may be hosted or facilitated by graphics driver 116. In yet another embodiment, audio management mechanism 110 may be hosted by or part of graphics processing unit ("GPU" or simply graphics processor") 114 or firmware of graphics processor 114; for example, audio management mechanism 110 may be embedded in or implemented as part of the processing hardware of graphics processor 114, such as in the form of display-based audio management component ("audio management component") 120. Further, graphics driver 116 may host detection and facilitation logic 140 to offer interface capabilities and other audio capabilities as it detects any sink devices connected to computing device 100.

Similarly, in yet another embodiment, audio management mechanism 110 may be hosted by or part of central processing unit ("CPU" or simply "application processor") 112; for example, audio management mechanism 110 may be embedded in or implemented as part of the processing hardware of application processor 112, such as in the form of audio management component 130.

However, it is contemplated and to be noted that embodiments are not limited to computing device 100 or/or any particular system or manner to placement or hosting of any of the elements of audio management mechanism 110, one or more of audio management components 120, 130, and detection and facilitation logic 140.

It is contemplated that this novel technique is limited to a software implementation or a hardware implementation and, as will be further described in this document, this novel technique may be applied and implemented in software, hardware, or any combination thereof, such as firmware. It is contemplated that embodiments are not limited to certain implementation or hosting of audio management mechanism 110 and that one or more portions or components of audio management mechanism 110 may be employed or implemented as hardware, software, or any combination thereof, such as firmware.

Computing device 100 may host network interface device(s) to provide access to a network, such as a LAN, a wide area network (WAN), a metropolitan area network (MAN), a personal area network (PAN), Bluetooth, a cloud network, a mobile network (e.g., 3$^{rd}$ Generation (3G), 4$^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
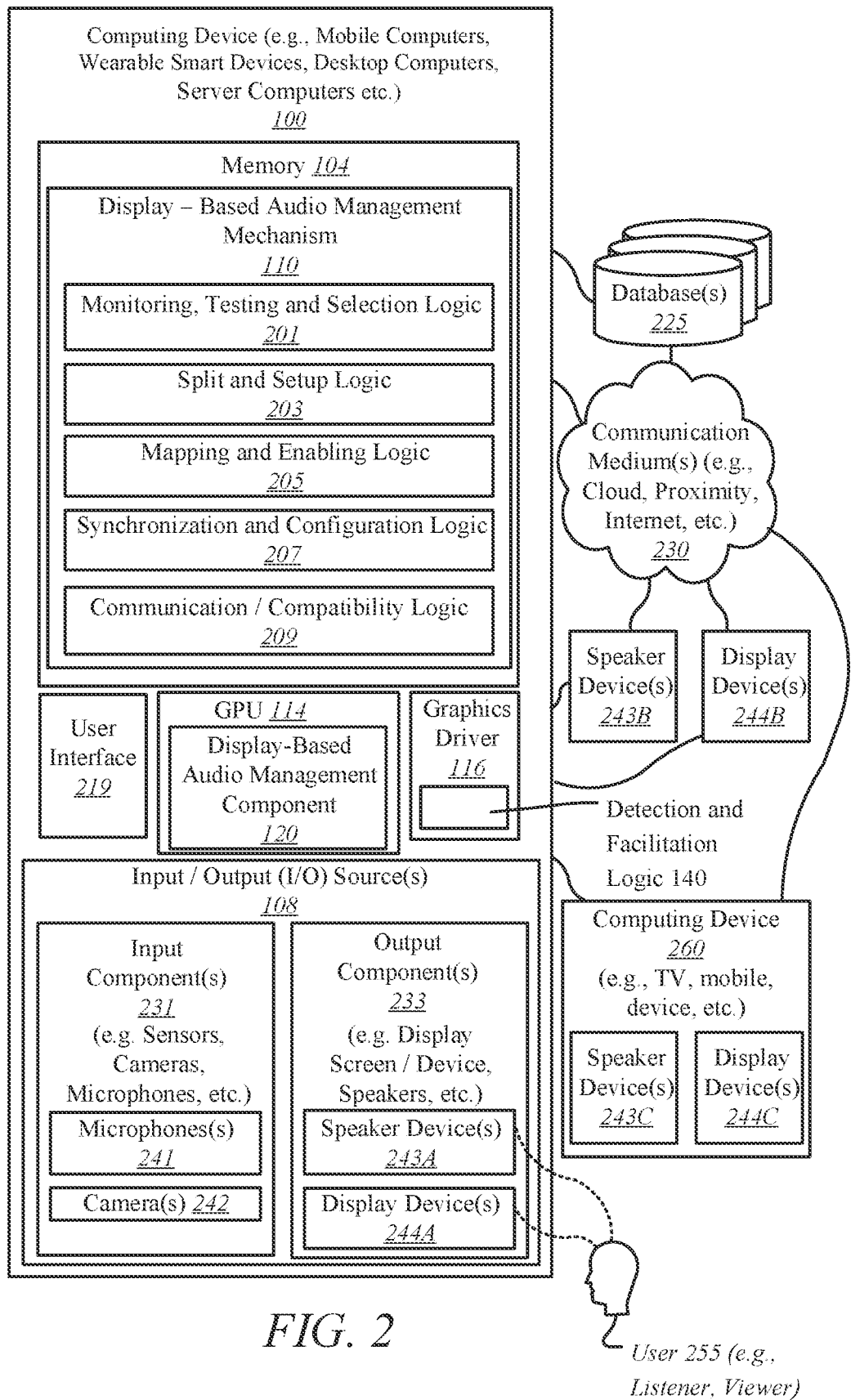
FIG. 2 illustrates a display-based audio management mechanism according to one embodiment.

FIG. 2 illustrates display-based audio management mechanism 110 of FIG. 1 according to one embodiment. For brevity, many of the details already discussed with reference to FIG. 1 are not repeated or discussed hereafter. In one embodiment, computing device 100 employs audio management mechanism 110, one or more of audio management components 120, 130, and detection and facilitation logic 140 of FIG. 1. As illustrated, in one embodiment, audio management mechanism 110 may include any number and type of components, such as (without limitations): monitoring, testing, and selection logic ("MTS logic") 201; split and setup logic 203; mapping and enabling logic 205; synchronization and configuration logic 207; and communication/compatibility logic 209.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O source(s) 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243A, speaker(s) 243B, speaker(s) 243C, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as audio management component 130 and/or audio management component 120 hosted by application processor 112 and/or graphics processor 114, respectively, of FIG. 1 having to facilitate or execute the corresponding logic to perform certain tasks.

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

To avoid any potential confusion between terms, it is contemplated and to be noted that user(s) 255 may also include speaker(s), such as individual(s), person(s), human(s), etc., who may speak into microphone(s) 241 of computing device 100 using their voices or sounds, like words, phrases, sentences, etc., while "speaker device(s)" or simply "speaker(s)" 243A, 243B, 243C refer to electronic part(s) of output component(s) 233 and further refer to one or more output device(s) coupled to or embedded into computing device 100 to convert electric signals into sound.

As described earlier, conventional techniques are capable of distinguishing between the different audio streams associated with different speakers or devices, which significantly limits any performance associated with such conventional techniques.

Embodiments provide for a novel technique, as facilitated by one or more of audio management mechanism 110, audio management component 120, detection and facilitation logic 140, and/or audio management component 130 of FIG. 1, where multiple audio streams being emitted from multiple speaker devices 243A or display(s) 244A that are part of or embedded in computing device 100 (also referred to as "media device") or separate or standalone multiple media devices, such as speaker(s) 243B, display(s) 244B, or be part of another computing device 260, such as speaker(s) 243C, display(s) 244C, coupled to computing device 100, whether they be connected through cables or communication medium(s) 230. This combination of devices will be further described and illustrated with respect to one or more subsequent figures in this document.

Embodiments provide for a novel technique, as facilitated by one or more of audio management mechanism 110, audio management component 120, detection and facilitation logic 140, and/or audio management component 130 of FIG. 1, to derive the stereo sound effect with native devices in hands, which can allow for replacement of standalone speakers and loudspeakers with display audio signals with interfaces, like HDMI, DisplayPort, Thunderbolt, TypC playback device, etc. This novel technique further allows for reusing of audio endpoints on playback devices, saving the cost associated with multiple channel loudspeakers and high-end sound cards/audio adapters, saving the physical space, such as in office or home, and saving power consumption from having additional loudspeakers, etc.

As described earlier, one or more of audio management mechanism 110, audio management component 120, detection and facilitation logic 140, and/or audio management component 130 of FIG. 1 may be used to perform the tasks of display-based audio splitting in media environment; however, for the same of brevity, clarity, and ease of understanding, this illustrated embodiment primarily focusses on audio management mechanism 110 and its various elements 201, 203, 205, 207, 209 along with references to detection and facilitation logic 140 and occasionally referring to audio management component 120.

In one embodiment, MTS logic 201 may continue to monitor the sounds being emitted from speaker(s) 243A, 243B, 243C and/or display(s) 244A, 244B, 244C. In one embodiment, speaker(s) 243A, 243B, 243C and/or display(s) 244A, 244B, 244C are monitored and initially grouped together by MTS logic 201 and then put through testing and selection purposes as facilitated by MTS logic 201.

For example, as facilitated by MTS logic 201, speaker(s) 243A, 243B, 243C and/or display(s) 244A, 244B, 244C are tested for their audio streams, where each of the audio stream is associated with a single one of speaker(s) 243A, 243B, 243C and/or display(s) 244A, 244B, 244C so as to recognize which one of speaker(s) 243A, 243B, 243C and/or display(s) 244A, 244B, 244C is emitted which audio stream and further, which audio stream corresponds to which video stream being displayed on one of display(s) 244A, 244B, 244C.

In one embodiment, once the audio streams and their corresponding speaker(s) 243A, 243B, 243C and/or display(s) 244A, 244B, 244C are determined by MTS logic 201, then one of computing devices 100, 260 is selected to serve as a primary or main device to control and manage other devices, such as computing device 260, speaker(s) 243B, display(s) 244C. For example, in the illustrated embodiment, computing device 100 may be selected by MTS logic 201 to serve as the primary device within the group of multiple devices 100, 260, 243B, and 244B. This information is then provided from MTS logic 201 to split and setup logic 203 to perform other processes.

In one embodiment, upon receiving the pertinent information, split and setup logic 203 facilitates split of audio streams by their corresponding devices, such as speaker(s) 243A, 243B, 243C and/or display(s) 244A, 244B, 244C, by setting the split mode, while allowing control and management of all devices 100, 260, 243B, 244B to the primary device, such as computing device 100.

Once the split is setup by split and setup logic 203, mapping and enabling logic 205 is invoked to enable mapping of the split audio streams with their corresponding audio channels, such as speaker(s) 243A, 243B, 243C and/or display(s) 244A, 244B, 244C, as well as to each other. Further, in one embodiment, detection and facilitation logic 140 at graphics driver 116 works with one or more audio drivers at computing device 100 to detect the audio streams and their correspondingly setup audio channels, such as speaker(s) 243A, 243B, 243C and/or display(s) 244A, 244B, 244C, and facilitate initialization of these audio channels, such as speaker(s) 243A, 243B, 243C and/or display(s) 244A, 244B, 244C, to report the mapping and the corresponding setup to an operation system, such as operating system 106 of FIG. 1, where, in one embodiment, the point mapping may end upon initialization by the operating system.

Further, in some embodiments, upon splitting of the audio streams, synchronization and configuration logic 207 is facilitated to perform synchronization between speaker(s) 243A, 243B, 243C and/or display(s) 244A, 244B, 244C such that the audio streams are properly managed as one or more of speaker(s) 243A, 243B, 243C and/or display(s) 244A, 244B, 244C are moved around or any of their audio and/or video contents are changed. For example, as one or more of speaker(s) 243A, 243B, 243C and/or display(s) 244A, 244B, 244C are moved from one physical location to another or when the video contents on one or more of display(s) 244A, 244B, 244C change, etc., synchronization and configuration logic 207 ensure that the audio streams are continuously synchronized and managed between speaker(s) 243A, 243B, 243C and/or display(s) 244A, 244B, 244C so that listener(s) 255 can have a maintained and seamless listening to the various audio streams.

In one embodiment, this synchronization and configuration settings are stored through detection and facilitation logic 140 so that may be continuously referenced and used. Further, MTS logic 201 may be used to facilitate testing of this synchronization and configuration settings, the results of which are used in confirmation of these setting, such as whether the settings are acceptable or not. If the settings are acceptable, they are communicated on to detection and facilitation logic 140 of graphics driver 116 and if not, the settings fail the test and are rejected in favor of new settings.

Further, in one embodiment, detection and facilitation logic 140 hosted by graphics driver 116 may be used to facilitate various tasks or operations of various elements of audio management logic 110 and audio management components 120, 130, such that in some embodiments, one or more of tasks or operations triggered by one or more of audio management logic 110 and audio management components 120, 130 may be one or more of detected by, checked with, approved by, and facilitated by detection and facilitation logic 140.

It is contemplated that embodiments are not limited to any number or type of microphone(s) 241, camera(s) 242, speaker(s) 243A, 243B, 243C, display(s) 244A, 244B, 244C, etc. Similarly, as illustrated, output component(s) 233 may include any number and type of speaker(s) or speaker device(s) 243A, 243B, 243C to serve as output devices for outputting or giving out audio from computing device 100 for any number or type of reasons, such as human hearing or consumption. For example, speaker(s) 243A, 243B, 243C work the opposite of microphone(s) 241 where speaker(s) 243A, 243B, 243C convert electric signals into sound.

Further, input component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", "programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s)

(e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "audio", "audio stream", "audio split", "synchronize", "display-based", "speakers", "audio channels", "enabling", "selecting", "mapping", "initializing", "configuring", "testing", "machine learning interface", "machine learning model", "neural network", "creating", "training", "inferencing", "classifying", "scoring", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from audio management mechanism 110, one or more of audio management components 120, 130, detection and facilitation logic 140 of FIG. 1 to facilitate various embodiments including adding, removing, and/or enhancing certain features. For brevity, clarity, and ease of understanding of audio management mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

Figure 3A:
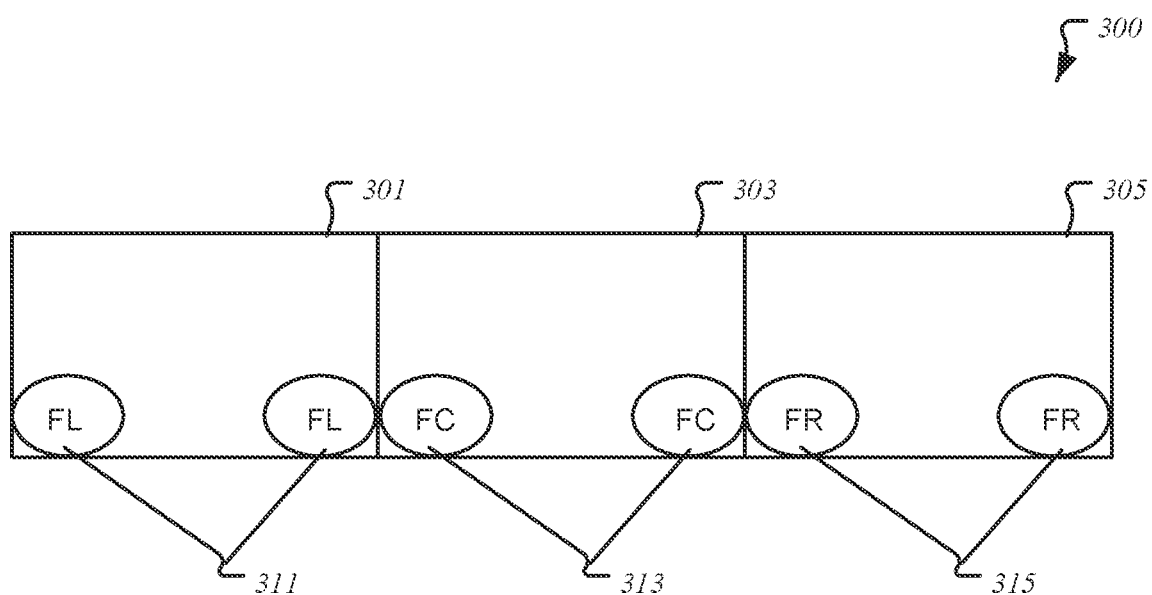
FIG. 3A illustrates a use case scenario according to one embodiment.

FIG. 3A illustrates a use case scenario 300 according to one embodiment. For the sake of brevity, many of the details previously mentioned or discussed with reference to FIGS. 1-2 may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by audio management mechanism 110, one or more of audio management components 120, 130, and/or detection and facilitation logic 140 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As illustrated, this use case scenario 300 illustrates three monitors or computer screens 301, 303, 305 side-by-side or coupled together to provide an extended screen with a wider view from the point of view of video presentation. However, for display audio, there only needs to be one of the six outputs, such as speakers (also referenced as "audio channels") 311, 313, 315 of the three displays 301, 303, 305 to be on or outputting audio stream consistent with content being displayed on displays 3031, 303, 305. Speakers 311, 313, 315 include front-left speakers 311, front-center speakers 313, and front-right speakers 315.

For example, each monitor or display 301, 303, 305 is shown as two audio channels/speakers 311, 313, 315, respectively, to output audio streams. However, using the novel technique of this document, despite having six audio channels 311, 313, 315, the audio streams are split and mapped with displays 301, 303, 305 such that audio stream can be outputted from only one of six audio channels 311, 313, 315 depending on the video output of their corresponding displays 301, 303, 305.

For example, logic for audio topology is defined in graphics kernel node driver and user interface, through audio channel splitting and mapping, such as using a special designed hardware audio pin, and synchronization of audio streams, there these audio streams are entirely independent from each other.

Figure 3B:
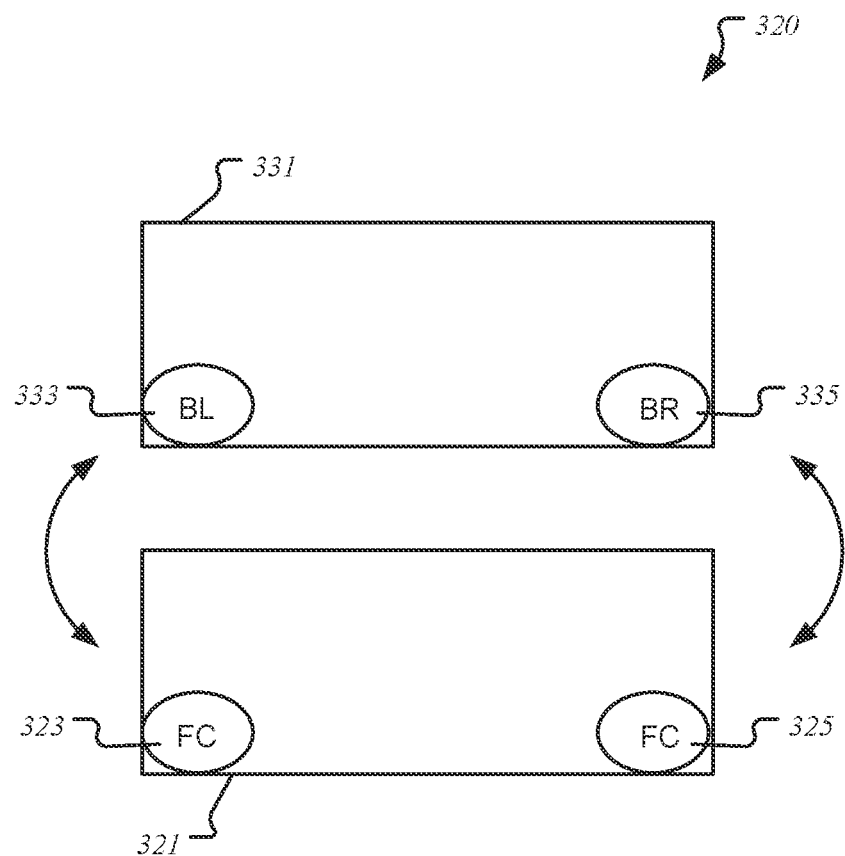
FIG. 3B illustrates a use case scenario according to one embodiment.

FIG. 3B illustrates a use case scenario 320 according to one embodiment. For the sake of brevity, many of the details previously mentioned or discussed with reference to FIGS. 1-3A may not be discussed or repeated hereafter.

In this illustrated embodiment, two displays 321 and 331 are connected to work together, where display 321 (e.g., laptop computer) may be selected to serve as a host or primary device to control and manage display 331 (e.g., television) serving as a secondary device. As illustrated, each device 321 and 331 has two speakers 323, 325 and 333, 335, respectively, and including front-center speakers 323, 325 associated with display 321, and back-left speaker 333 and back-right speaker 335 corresponding to display 331. Since this use case scenario 320 includes a far field case, in one embodiment, the audio streams of these output speakers 323, 323, 333, 335 are split as two near-field center audio channels and two far-field audio channels.

Figure 3C:
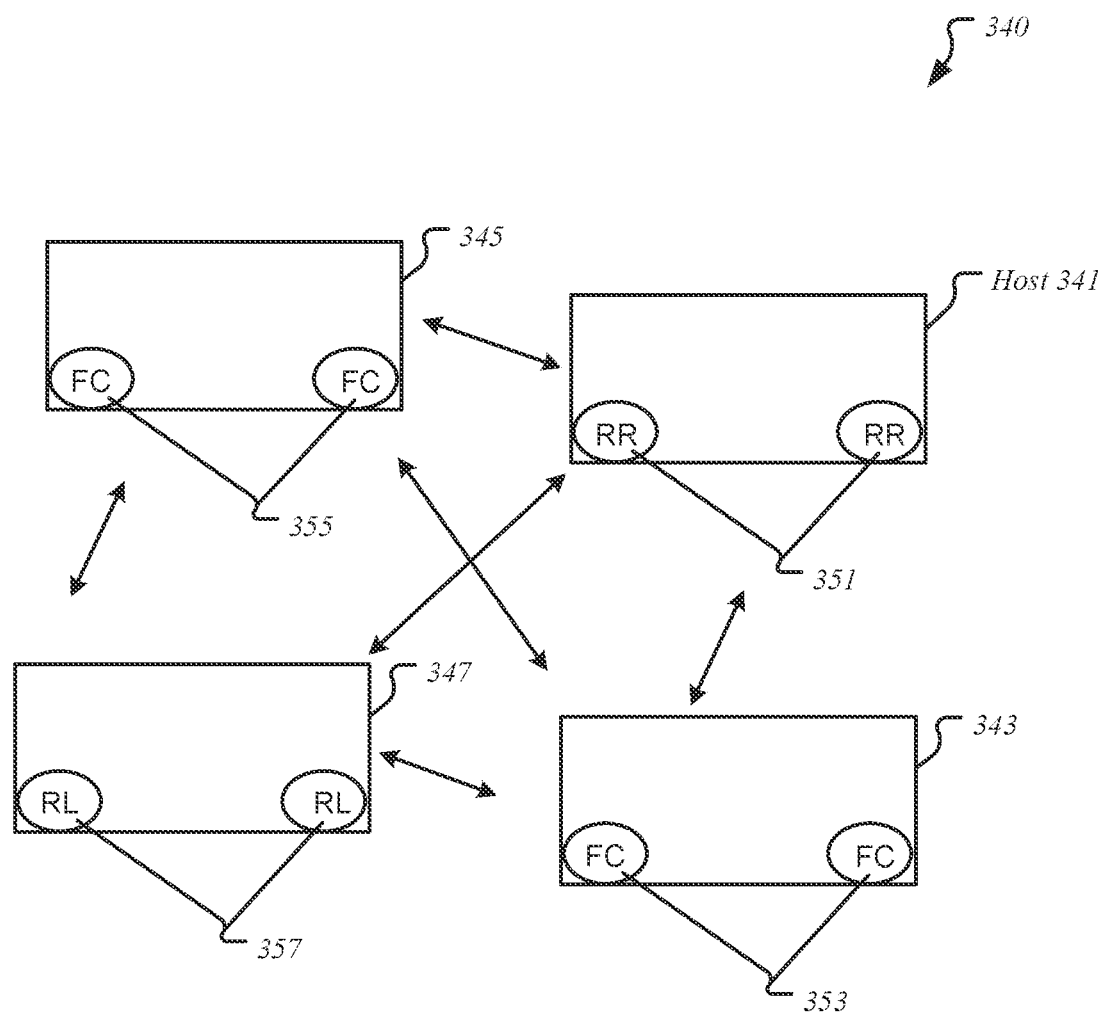
FIG. 3C illustrates a use case scenario according to one embodiment.

FIG. 3C illustrates a use case scenario 340 according to one embodiment. For the sake of brevity, many of the details previously mentioned or discussed with reference to FIGS. 1-3B may not be discussed or repeated hereafter.

As illustrated, this use case scenario 340 include four display devices 341, 343, 345, 347, each having two speakers or audio channels 351, 353, 355, 357, respectively. In the illustrated embodiment, speakers 351 are right-rear, speakers 353 are front-center, speakers 355 are front-center, while speakers 357 are rear-left. This is a group of 2×2 devices with device 341 (e.g., desktop computer) serving as a host/primary display coupled to and in communication with a number of secondary display devices, such as display device 343 (e.g., laptop computer), display device 345 (e.g., tablet computer), and display device 347 (e.g., smartphone).

For example, in one embodiment, using the novel technique of this document, secondary display devices 343, 345, 347 may be downgraded into a single monitor or panel such that secondary display devices 343, 345, 347 serve as displays or monitors or panels, while primary device 341 perform control and manages display devices 343, 345, 347. In one embodiment, primary device 341 decides as to how to configure various audio channels 351, 353, 355, 357 according to their physical locations to split the audio streams so they correspond to the video streams being displayed on and shared between all display devices 341, 343, 345, 347.

Figure 3D:
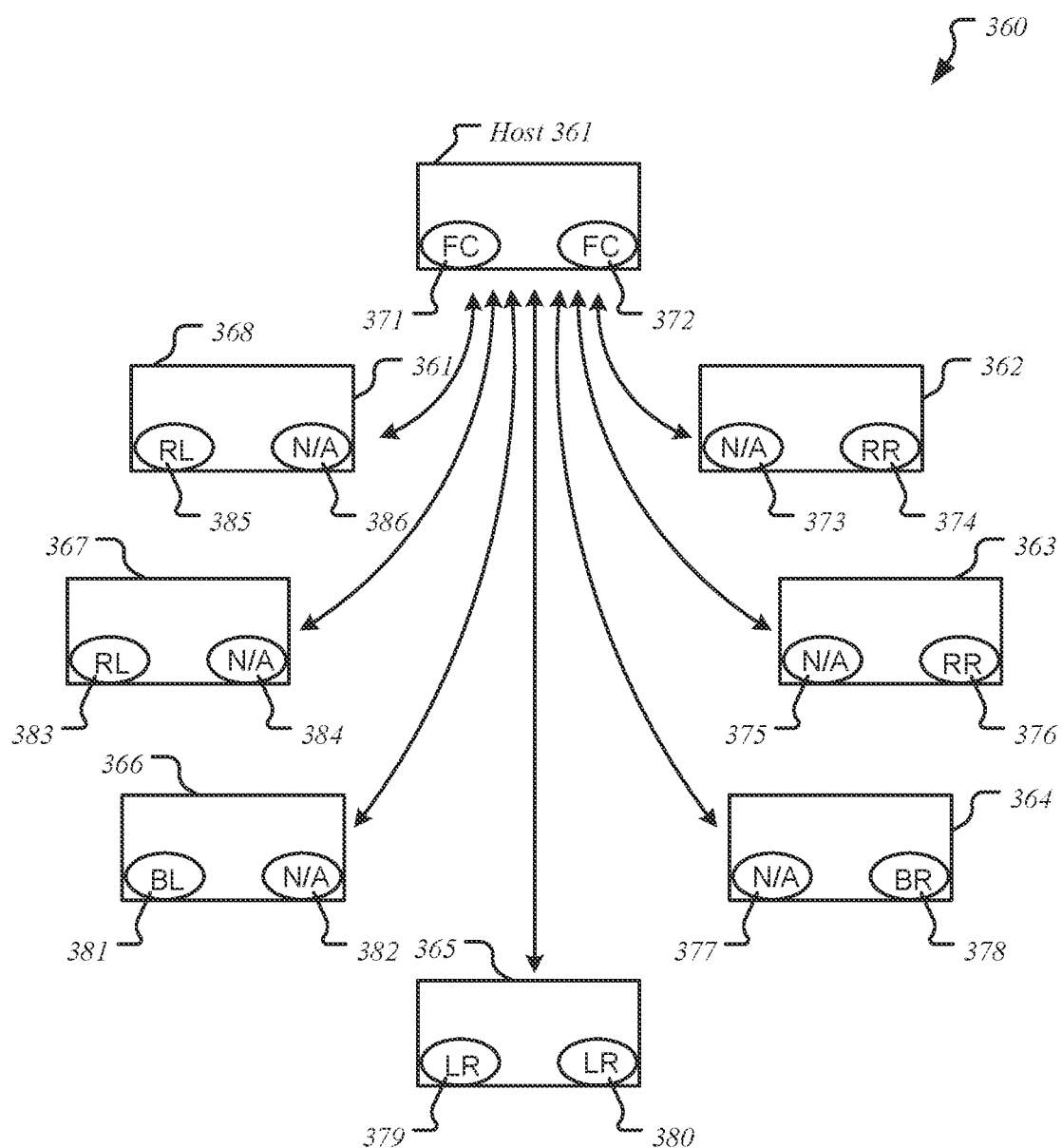
FIG. 3D illustrates a use case scenario according to one embodiment.

FIG. 3D illustrates a use case scenario 360 according to one embodiment. For the sake of brevity, many of the details previously mentioned or discussed with reference to FIGS. 1-3C may not be discussed or repeated hereafter.

As illustrated, use case scenario 360 includes eight display devices 361, 362, 363, 364, 365, 366, 367, 368 are shown as in communication with each other, where display device 361 (e.g., laptop computer) is shown as serving as the host/primary device, while other display devices 362, 363, 364, 365, 366, 367, 368 (e.g., tablet computers, smartphones, etc.) serve as secondary display devices. This could be a setup for classrooms, conference rooms, table gaming room, etc., where, for example, primary device 361 may be used for lecture or presentation purposes or managing games at a table, etc.

In this illustrated embodiment, each device 361-368 includes two audio channels each, such as audio channels 371, 372, 373, 374, 375, 376, 377, 378, 379, 380, 381, 382, 383, 384, 385, 386 ranging from front-center to rear-right to back-left to rear-left, etc. As with FIG. 3C, in splitting the audio streams from various audio channels 371-386, secondary devices 362-368 are downgraded to serve as a monitor and this configuration is then stored and saved by host device 361 to be used and re-used with this use case scenario 360.

Figure 3E:
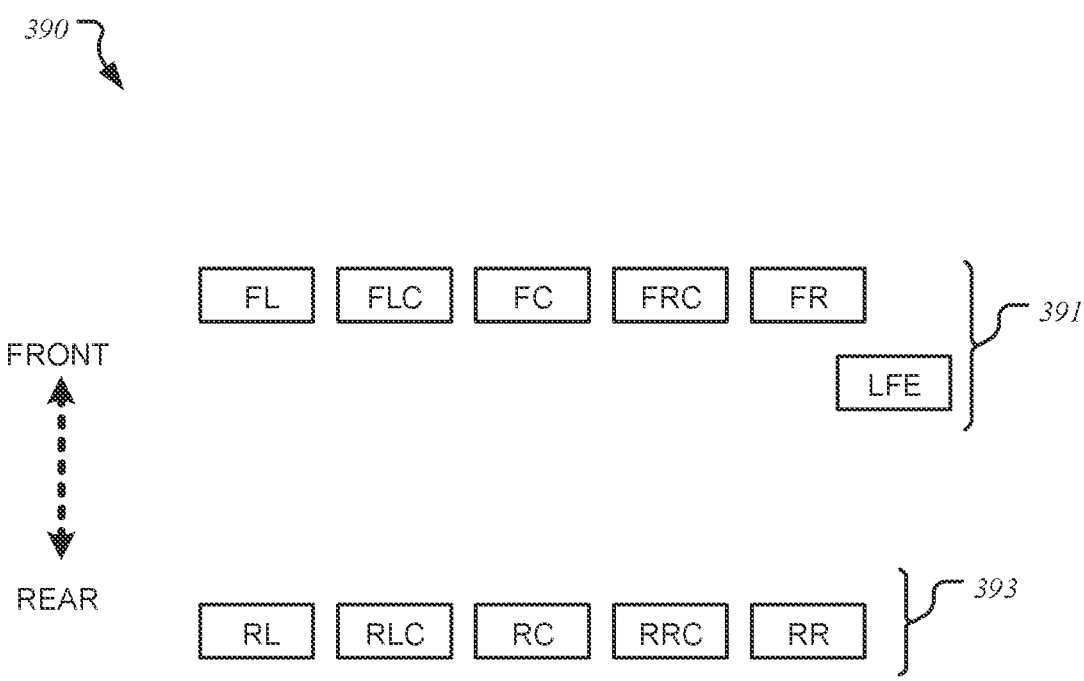
FIG. 3E illustrates an audio channel definition and identification sequence according to one embodiment

FIG. 3E illustrates an audio channel definition and identification sequence 390 according to one embodiment. For the sake of brevity, many of the details previously mentioned or discussed with reference to FIGS. 1-3D may not be discussed or repeated hereafter.

As illustrated, upon splitting the audio streams as described with reference to FIG. 2 and other preceding figures, various audio channels, such as those associated with speaker(s) 243A, 243B, 243C and display(s) 244A, 244B, 244C of FIG. 2, may then be defined and identified in some manner so each audio channel is distinct from all other audio channels based on its physical location and audio placement within the group.

In the illustrated embodiment of sequence 390, two rows, front row and back row, of audio channels are shown, where the front row includes six audio channels 391 that include front-left (FL), front-left-center (FLC), front-center (FC), front-right-center (FRC), front-right (FR), and low frequency effect (LFE). Similarly, the back row includes five audio channels 393 including rear-left (RL), real-left-center (RLC), rear-center (RC), rear-right-center (RRC), and rear-right (RR). It is contemplated and to be noted, embodiments are not limited to any particular definition or identification schematics or sequences, such as sequence 390, and that embodiments are compatible and workable with any number and types of arrangement and naming or labeling.

Figure 4A:
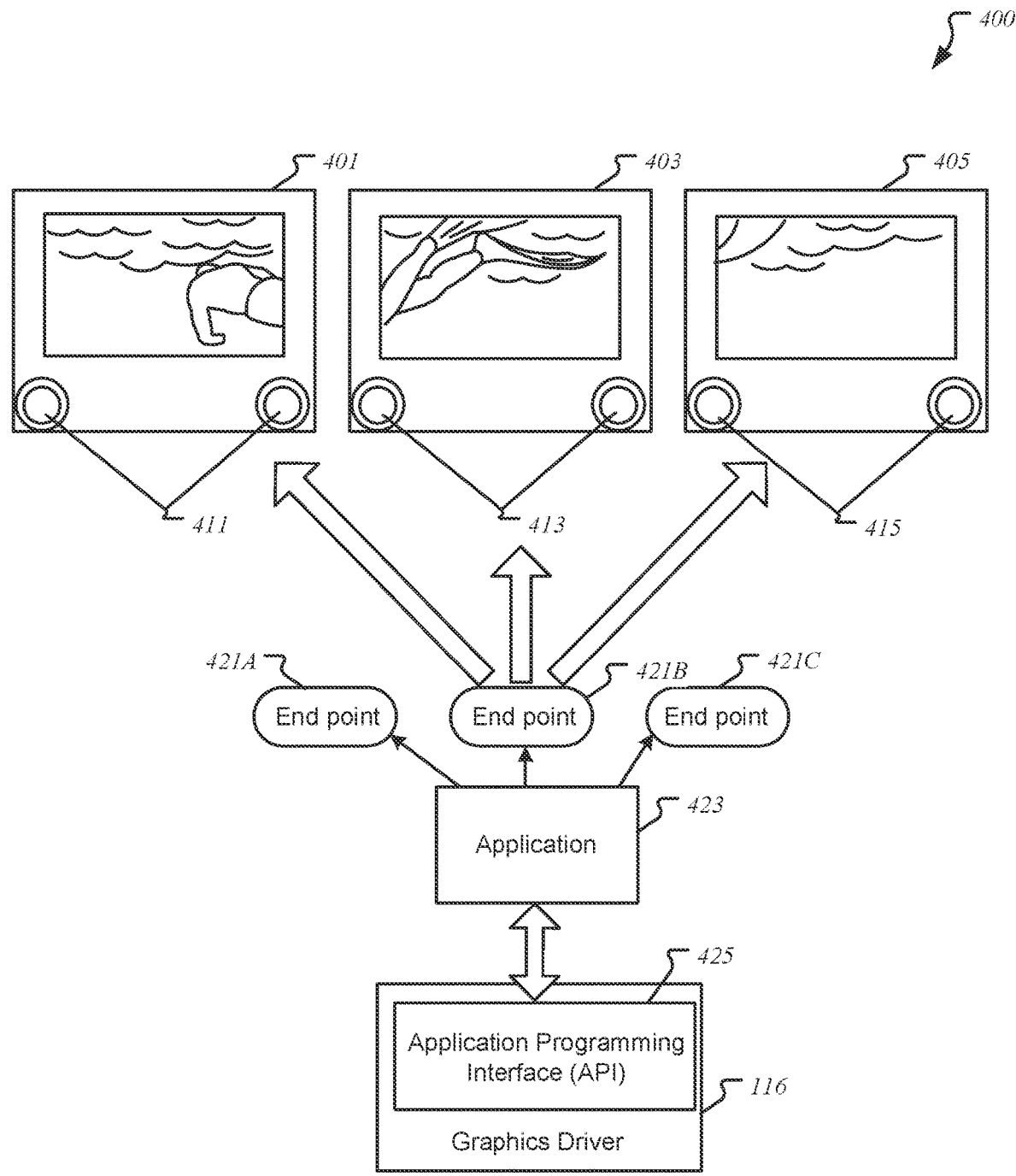
FIG. 4A illustrates a multiple audio points architecture according to one embodiment

FIG. 4A illustrates a multiple audio points architecture 400 according to one embodiment. For the sake of brevity, many of the details previously mentioned or discussed with reference to FIGS. 1-3E may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by audio management mechanism 110, one or more of audio management components 120, 130, and/or detection and facilitation logic 140 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As illustrated embodiment of multiple audio points architecture ("architecture") 400 is shown as communicating multiple audio streams through multiple end points 421A, 421B, 421C that are then broadcasted through various audio channels or speakers 411, 413, and 415 of multiple corresponding media devices 401, 403, 405, respectively. As further illustrated, these audio streams are associated with application 423, which is managed and facilitated using graphics driver 116 through one or more interfaces, such as application programming interface (API) 425.

As already described with reference to FIG. 2 and other preceding figures, these audio streams and their corresponding sets of audio channels 411, 413, and 415 are split, synchronized, and configured such that the user listening to the audio input of these audio streams though audio channels 411, 413, and 415 is balanced, seamless, and controlled. For example, which audio steam should be delayed in the favor of which other audio stream may be seamlessly through one or more components and mechanisms, such as one or more of graphics driver 116, application processor 112, graphics processor 114, and as facilitated by audio management mechanism 110, one or more of audio management components 120, 130, and/or detection and facilitation logic 140 of FIG. 1.

Figure 4B:
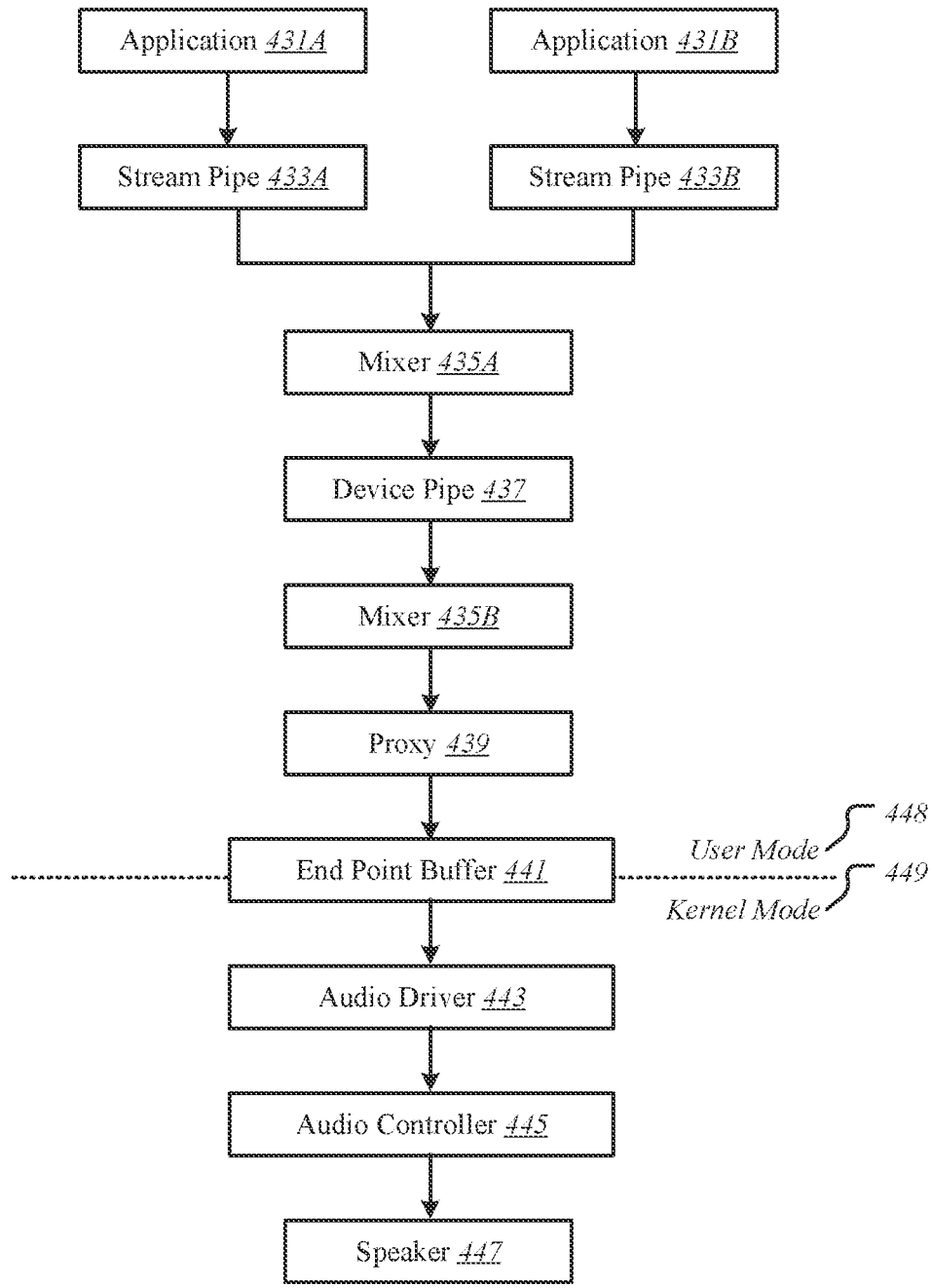
FIG. 4B illustrates a transaction sequence according to one embodiment.

FIG. 4B illustrates a transaction sequence 430 according to one embodiment. For the sake of brevity, many of the details previously mentioned or discussed with reference to FIGS. 1-4A may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by audio management mechanism 110, one or more of audio management components 120, 130, and/or detection and facilitation logic 140 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

The illustrated embodiment provides for transaction sequence 430 that runs from applications 431A, 431B to speaker 447, where one or more audio streams are generated through one or more applications 431A, 431B and put through the process of grouping, splitting, synchronizing, testing, and configuring until they reach and are outputted through speaker 447. In one embodiment, to facilitate synchronization and delay adjustments between multiple audio streams, certain processing objects may be used to provide customizable algorithm-based digital signal processing using any number and type of operating systems. In one embodiment, a user interface may be used to enable a shared mode so that the processing object are allowed to take over control before the audio synchronizing period. Further, any audio delays and adjustment ranges are determined on-the-fly depending on the needs for fine tuning for minimum/maximum delays based on the surface resolution.

For example, in some embodiment, these processing objects may facilitate audio effects at various points during transaction sequence 430, where these locations may include stream pipes 433A, 433B for applying stream effects, device pipe 437 for applying mode effects, and proxy 439 for applying endpoint effects. As described earlier, audio streams are generated based on instructions issued by one or more applications 431A, 431B and processed and pass through one or more stream pipes 433A, 433B, mixer 435A, device pipe 437, another mixer 435B, and proxy 439 in user mode 448, passing through end point buffer 441 and entering into kernel mode 449 as the audio streams reach audio driver 443.

In one embodiment, the audio streams are further processed at audio driver 433 using any number and type of components and objects, such as a high-definition (HD) audio bus driver, endpoint effects, etc. The audio streams then pass through audio controller 445 (e.g., HD audio controller) to then reach speaker 447, through which the audio streams are outputted for the user (e.g., listener).

Further, in some embodiments, one or more audio categories (as selected by one or more applications 431A, 431B, etc.) may be mapped to one or more audio signal processing modes (as defined one or more of audio driver 443, graphics driver 116, etc.) as facilitated by mapping and enabling logic 205 of FIG. 2, where these audio signal processing modes are used to reflect the description or processing status of audio streams and further to add any audio effects to optimize audio signals to offer the best user experience. A few examples of audio processing modes are provided in Table 1 below:

TABLE 1

| Mode | Render/Capture | Description |
| --- | --- | --- |
| Raw | Both | Raw mode specifies that there should not be any signal processing applied to the stream. An application can request a raw stream that is completely untouched and perform its own signal processing. |
| Default | Both | This mode defines the default audio processing. |
| Movies * | Render | Movie audio playback |
| Media * | Both | Music audio playback (default for most media streams) |
| Speech * | Capture | Human voice capture (e.g. input to Cortana) |
| Communications * | Both | VOIP render and capture (e.g. Skype, Lync) |
| Notification * | Render | Ringtones, alarms, alerts, etc. |

Further, in one embodiment, one or more applications 431A, 431B may tag an audio stream with a specific audio stream category to inform a media device, such as the media device hosting speaker 447, of the usage of that audio stream. One or more applications 431A, 431B may define and set the audio stream category, as facilitated by mapping and enabling logic 205 of FIG. 2, using one or more audio APIs and soon after generating an audio stream. A few examples of audio stream categories are listed in Table 2 below:

TABLE 2

| Category | Description |
| --- | --- |
| Movie | Movies, video with dialog (Replaces ForegroundOnlyMedia) |
| Media | Default category for media playback (Replaces BackgroundCapableMedia) |
| Game Chat | In-game communication between users (New category in Windows 10) |
| Speech | Speech input (e.g. personal assistant) and output (e.g. navigation apps) (New category in Windows 10) |
| Communications | VOIP, real-time chat |
| Alerts | Alarm, ring tone, notifications |
| Sound Effects | Beeps, dings, etc |
| Game Media | In game music |
| Game Effects | Balls bouncing, car engine sounds, bullets, etc. |
| Other | Uncategorized streams |

Figure 4C:
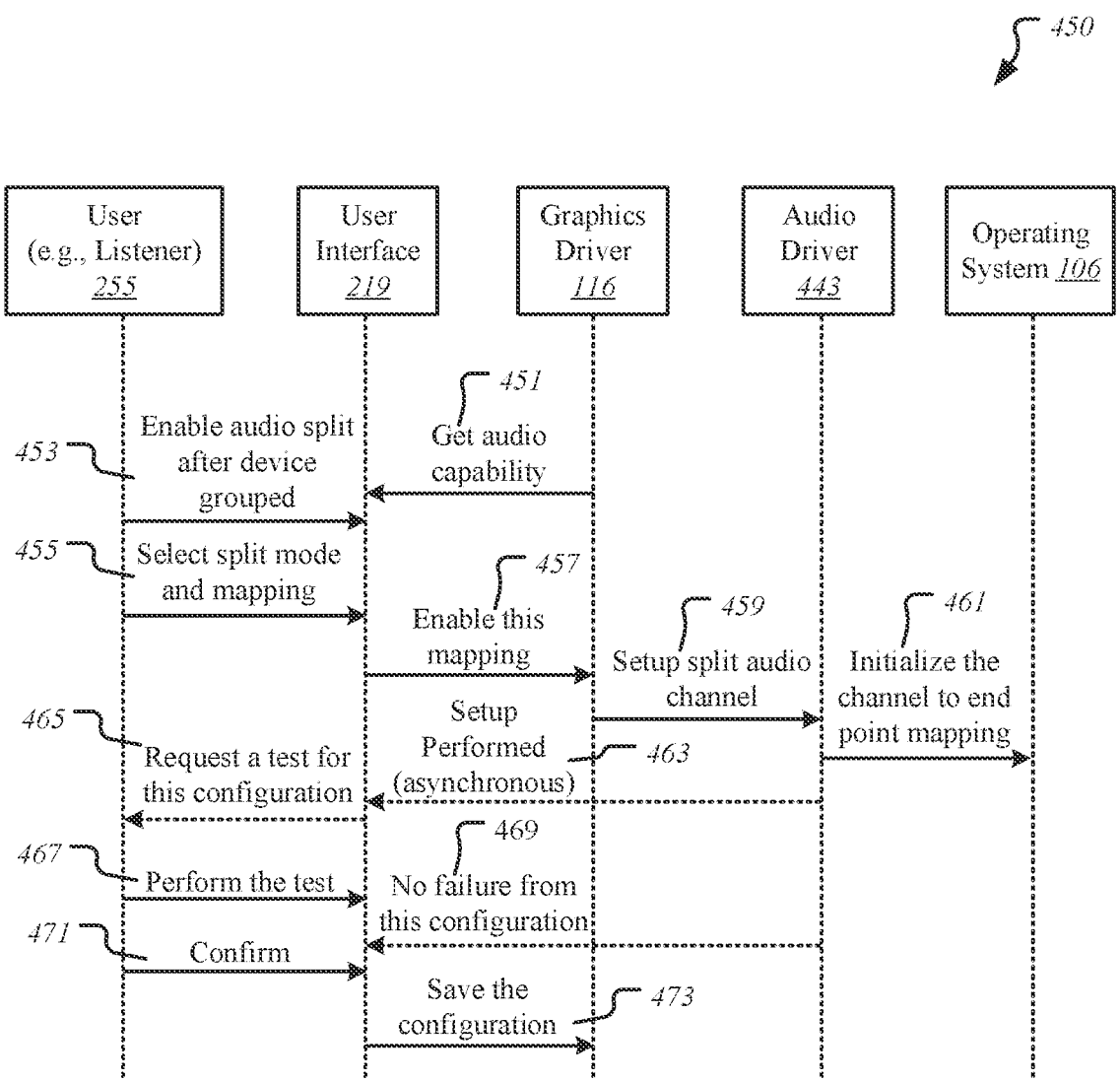
FIG. 4C illustrates a transaction sequence according to one embodiment.

FIG. 4C illustrates a transaction sequence 450 according to one embodiment. For the sake of brevity, many of the details previously mentioned or discussed with reference to FIGS. 1-4B may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by audio management mechanism 110, one or more of audio management components 120, 130, and/or detection and facilitation logic 140 of FIG. 1. Any processes or transactions associated with this and other illustrations may be illustrated or recited in linear sequences for brevity and clarity in presentation; however, it is contemplated that any number of them can be performed in parallel, asynchronously, or in different orders In the illustrated embodiment, transaction sequence 450 begins with graphics driver 116, as facilitated by detection and facilitation logic 140 of FIG. 1, by receiving audio capabilities at 451 as soon as it detects any sink device (e.g., computing device 260, speaker(s) 243B, display(s) 244B, being connected to a source device (e.g., computing device 100). In some embodiments, user (e.g., listener) 255 may access a sink device to request the audio split feature at 453 to allow the source device to serve as a host system and set up the audio stream splitting. For example, user 255 may use the sink device to select an option or version of split mode and mapping at 455, such as a default version of split and mapping, a best version of split and mapping (such as using maximum number of audio capable displays, etc.), or a manual version where user 255 gets to choose set any type or extent of audio splitting, such as audio splitting as 2×1, 3×1, 4×1, 5×1, 6×1, 2×2, 2×3, 3×3, 3×4, etc.

Further, in one embodiment, mapping topology may be enabled at 457 for user 219 through user interface 219 and as facilitated by mapping and enabling logic 205 of FIG. 2. In one embodiment, a display driver (e.g., two-dimensional (2D) display driver) in a kernel mode may communicated with audio driver 443 (e.g., HD audio driver) via reserved registers to ensure that audio driver 443 receives messages from graphics driver 116 in setting up split audio channels at 459 in accordance with the request from user 255, while information operating system 106 that this multiple channel setup is done with a configured mapping network, to then initialize the channel to end point mapping at 461.

Further, audio driver 443 to return the status to user interface 219, stating whether the setup was performed successfully or not at 463. This then prompts a message to user 255, through user interface 219, regarding the success of the setup and whether to do the mapping or not, such as by requesting a test for this configuration at 465. At this point, user 255 may choose to a test at 467, such as by filing an audio test pattern once the configuration is done. If all measures are satisfied from an audio point of view, such as surround audio output sounds good to the audience, etc., then audio driver 443 may send a message to user interface 219 to inform of all measures have been satisfied and that there are no failures in configuration at 469. At 471, user 255 may confirm that the configuration to satisfaction by returning a message through user interface 219. Further, this configuration is then saved at 473 by graphics driver 116 as the last known good profile until there is another selection or request in the future.

Figure 5:
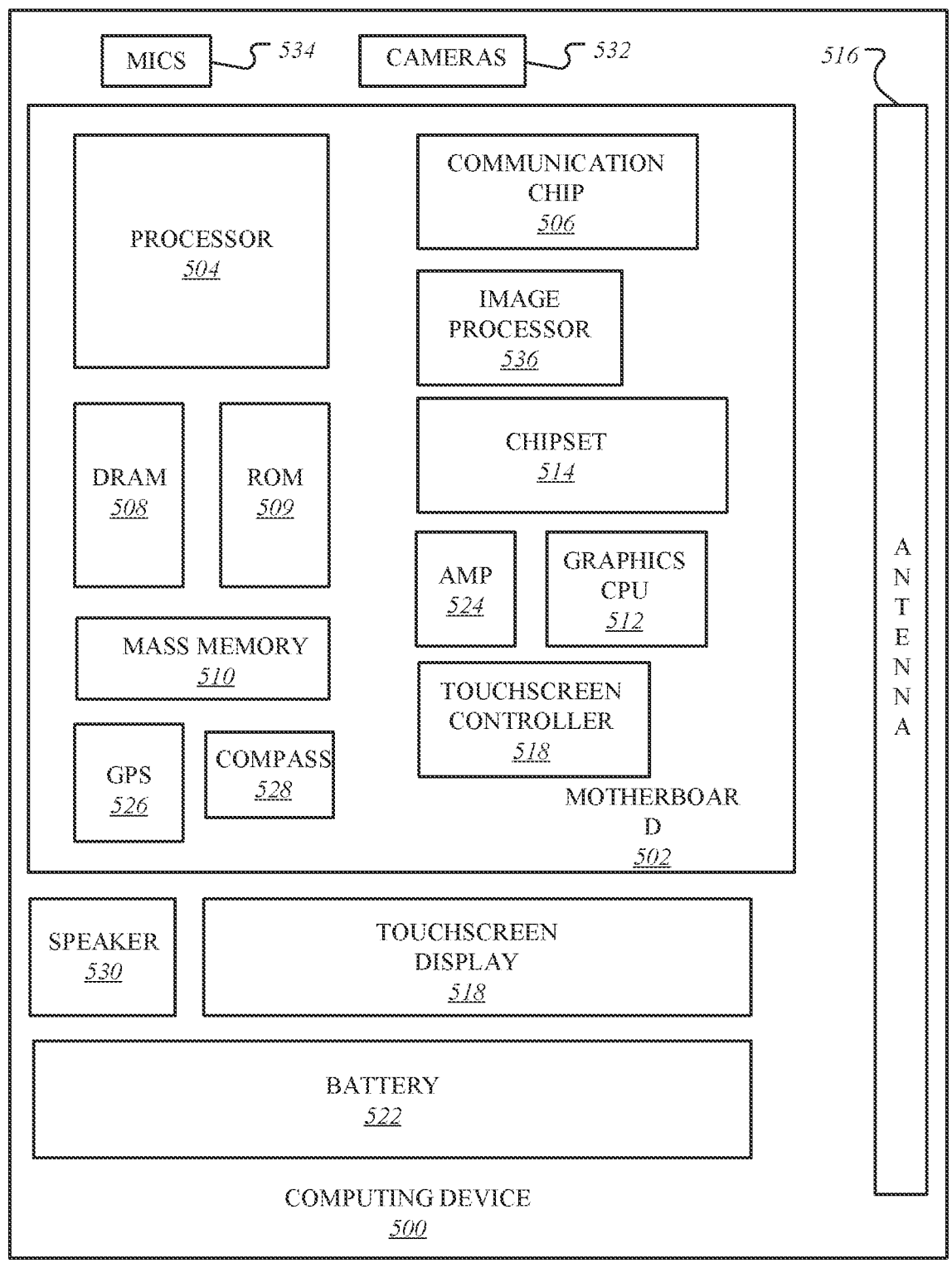
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
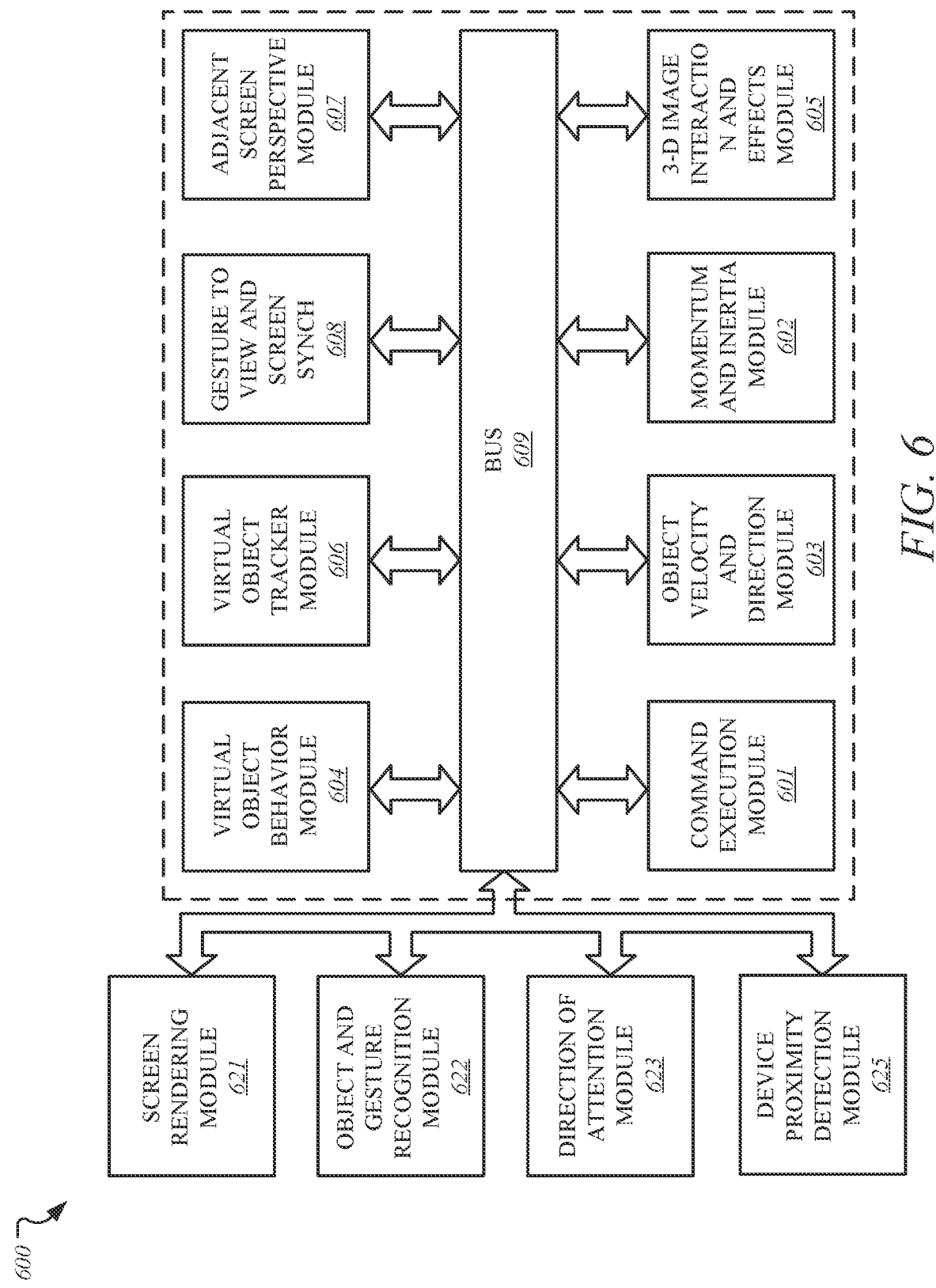
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate display-based audio splitting in media environment, the apparatus comprising: one or more processors to: receive a request to split audio streams associated with audio channels in communication with the apparatus serving as a host device, wherein the audio streams are generated by one or more applications; select a split mode to facilitate splitting of the audio streams; and split the audio streams based on the split mode such that the audio streams are continuously mapped to the audio channels to adjust for delays and fine tuning.

Example 2 includes the subject matter of Example 1, wherein splitting is further based on one or more audio processing modes and one or more audio stream categories assigned to the audio streams by the one or more applications, wherein the audio processing modes include one or more of raw, default, communication, media, speech, and notification, wherein the audio stream categories include one or more of movies, games, speeches, alerts, sound effects, game effects, and chats.

Example 3 includes the subject matter of Examples 1-2, wherein the one or more processors are further to: initialize the audio channels according to splitting of the audio streams; and facilitate configuration of the initialized audio channels based on one or more of the split mode, the one or more audio processing modes, and the one or more audio stream categories.

Example 4 includes the subject matter of Examples 1-3, wherein the one or more processors are further to test the configuration of the audio channels to determine whether the configuration of the audio channels satisfies the request made by the user.

Example 5 includes the subject matter of Examples 1-4, wherein the one or more processors are further to: reject the configuration, if the configuration fails to satisfy the request; and accept the configuration, if the configuration satisfies the request, wherein the accepted configuration is confirmed and stored for future uses.

Example 6 includes the subject matter of Examples 1-5, wherein the one or more processors are further to facilitate real-time monitoring and synchronization of the audio streams and the audio channels after splitting the audio streams.

Example 7 includes the subject matter of Examples 1-6, wherein the apparatus comprises a media device including one or more of a laptop computer, a monitor, a gaming device, a smart wearable device, a smartphone, a tablet computer, and a desktop computer, wherein the audio channels are associated with one or more of speaker devices and display devices, and wherein the one or more processors include a graphics processor and an application processor, wherein the one or more processors are co-located on a common semiconductor package.

Some embodiments pertain to Example 8 that includes a method facilitating display-based audio splitting in media environments, the method comprising: receiving, at a computing device, a request to split audio streams associated with audio channels in communication with the computing device serving as a host device, wherein the audio streams are generated by one or more applications; selecting a split mode to facilitate splitting of the audio streams; and splitting the audio streams based on the split mode such that the audio streams are continuously mapped to the audio channels to adjust for delays and fine tuning.

Example 9 includes the subject matter of Example 8, wherein splitting is further based on one or more audio processing modes and one or more audio stream categories assigned to the audio streams by the one or more applications, wherein the audio processing modes include one or more of raw, default, communication, media, speech, and notification, wherein the audio stream categories include one or more of movies, games, speeches, alerts, sound effects, game effects, and chats.

Example 10 includes the subject matter of Examples 8-9, further comprising initializing the audio channels according to splitting of the audio streams; and facilitating configuration of the initialized audio channels based on one or more of the split mode, the one or more audio processing modes, and the one or more audio stream categories.

Example 11 includes the subject matter of Examples 1-10, further comprising testing the configuration of the audio channels to determine whether the configuration of the audio channels satisfies the request made by the user.

Example 12 includes the subject matter of Examples 1-11, further comprising: rejecting the configuration, if the configuration fails to satisfy the request; and accepting the configuration, if the configuration satisfies the request, wherein the accepted configuration is confirmed and stored for future uses.

Example 13 includes the subject matter of Examples 1-12, further comprising facilitating real-time monitoring and synchronization of the audio streams and the audio channels after splitting the audio streams.

Example 14 includes the subject matter of Examples 1-13, wherein the computing device comprises a media device including one or more of a laptop computer, a monitor, a gaming device, a smart wearable device, a smartphone, a tablet computer, and a desktop computer, wherein the audio channels are associated with one or more of speaker devices and display devices, and wherein the computing device further comprises one or more processors include a graphics processor and an application processor, wherein the one or more processors are co-located on a common semiconductor package.

Some embodiments pertain to Example 15 that includes a data processing system comprising one or more processors to: receiving a request to split audio streams associated with audio channels in communication with the data processing system serving as a host device, wherein the audio streams are generated by one or more applications; selecting a split mode to facilitate splitting of the audio streams; and splitting the audio streams based on the split mode such that the audio streams are continuously mapped to the audio channels to adjust for delays and fine tuning; and a memory coupled to the one or more processors.

Example 16 includes the subject matter of Example 15, wherein splitting is further based on one or more audio processing modes and one or more audio stream categories assigned to the audio streams by the one or more applications, wherein the audio processing modes include one or more of raw, default, communication, media, speech, and notification, wherein the audio stream categories include one or more of movies, games, speeches, alerts, sound effects, game effects, and chats.

Example 17 includes the subject matter of Examples 15-16, wherein the one or more processors are further to: initialize the audio channels according to splitting of the audio streams; and facilitate configuration of the initialized audio channels based on one or more of the split mode, the one or more audio processing modes, and the one or more audio stream categories.

Example 18 includes the subject matter of Examples 15-17, wherein the one or more processors are further to test the configuration of the audio channels to determine whether the configuration of the audio channels satisfies the request made by the user.

Example 19 includes the subject matter of Examples 15-18, wherein the one or more processors are further to: reject the configuration, if the configuration fails to satisfy the request; and accept the configuration, if the configuration satisfies the request, wherein the accepted configuration is confirmed and stored for future uses.

Example 20 includes the subject matter of Examples 15-19, wherein the one or more processors are further to facilitate real-time monitoring and synchronization of the audio streams and the audio channels after splitting the audio streams.

Example 21 includes the subject matter of Examples 15-20, wherein the data processing system comprises a media device including one or more of a laptop computer, a monitor, a gaming device, a smart wearable device, a smartphone, a tablet computer, and a desktop computer, wherein the audio channels are associated with one or more of speaker devices and display devices, and wherein the one or more processors include a graphics processor and an application processor, wherein the one or more processors are co-located on a common semiconductor package.

Some embodiments pertain to Example 22 that includes an apparatus facilitating display-based audio splitting in media environments, the apparatus comprising: means for receiving, at the apparatus, a request to split audio streams associated with audio channels in communication with the computing device serving as a host device, wherein the audio streams are generated by one or more applications; means for selecting a split mode to facilitate splitting of the audio streams; and means for splitting the audio streams based on the split mode such that the audio streams are continuously mapped to the audio channels to adjust for delays and fine tuning.

Example 23 includes the subject matter of Example 22, wherein splitting is further based on one or more audio processing modes and one or more audio stream categories assigned to the audio streams by the one or more applications, wherein the audio processing modes include one or more of raw, default, communication, media, speech, and notification, wherein the audio stream categories include one or more of movies, games, speeches, alerts, sound effects, game effects, and chats.

Example 24 includes the subject matter of Examples 22-23, further comprising means for initializing the audio channels according to splitting of the audio streams; and means for facilitating configuration of the initialized audio channels based on one or more of the split mode, the one or more audio processing modes, and the one or more audio stream categories.

Example 25 includes the subject matter of Examples 22-24, further comprising means for testing the configuration of the audio channels to determine whether the configuration of the audio channels satisfies the request made by the user.

Example 26 includes the subject matter of Examples 22-25, further comprising: means for rejecting the configuration, if the configuration fails to satisfy the request; and means for accepting the configuration, if the configuration satisfies the request, wherein the accepted configuration is confirmed and stored for future uses.

Example 27 includes the subject matter of Examples 22-26, further comprising means for facilitating real-time monitoring and synchronization of the audio streams and the audio channels after splitting the audio streams.

Example 28 includes the subject matter of Examples 22-27, wherein the apparatus comprises a media device including one or more of a laptop computer, a monitor, a gaming device, a smart wearable device, a smartphone, a tablet computer, and a desktop computer, wherein the audio channels are associated with one or more of speaker devices and display devices, and wherein the apparatus further comprises one or more processors include a graphics processor and an application processor, wherein the one or more processors are co-located on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors to facilitate display-based audio splitting in media environments, the one or more processors to:
   receive a request to split audio streams associated with audio channels in communication with the apparatus serving as a host device, wherein the audio streams are generated by one or more applications;
   select a split mode to facilitate splitting of the audio streams, wherein the audio channels are initialized based on the splitting of the audio streams;
   split the audio streams based on the split mode such that the audio streams are continuously mapped to the audio channels to adjust for delays and fine tuning;
   facilitate configuration of the initialized audio channels based on one or more of the split mode, one or more audio processing modes, or one or more audio stream categories; and
   test the configuration of the audio channels to determine whether the configuration of the audio channels satisfies the request.

2. The apparatus of claim 1, wherein splitting is further based on the one or more audio processing modes and the one or more audio stream categories assigned to the audio streams by the one or more applications, wherein the audio processing modes include one or more of raw, default, communication, media, speech, and notification, wherein the audio stream categories include one or more of movies, games, speeches, alerts, sound effects, game effects, and chats.

3. The apparatus of claim 1, wherein the one or more processors are further to:
reject the configuration, if the configuration fails to satisfy the request; and
accept the configuration, if the configuration satisfies the request, wherein the accepted configuration is confirmed and stored for future uses.

4. The apparatus of claim 1, wherein the one or more processors are further to facilitate real-time monitoring and synchronization of the audio streams and the audio channels after splitting the audio streams.

5. The apparatus of claim 1, wherein the apparatus comprises a media device including one or more of a laptop computer, a monitor, a gaming device, a smart wearable device, a smartphone, a tablet computer, and a desktop computer, wherein the audio channels are associated with one or more of speaker devices and display devices, and wherein the one or more processors include a graphics processor and an application processor, wherein the one or more processors are co-located on a common semiconductor package.

6. A method comprising:
receiving, at a computing device, a request to split audio streams associated with audio channels in communication with the computing device serving as a host device, wherein the audio streams are generated by one or more applications;
selecting a split mode to facilitate splitting of the audio streams, wherein the audio channels are initialized based on the splitting of the audio streams;
splitting the audio streams based on the split mode such that the audio streams are continuously mapped to the audio channels to adjust for delays and fine tuning;
facilitating configuration of the initialized audio channels based on one or more of the split mode, one or more audio processing modes, and one or more audio stream categories; and
testing the configuration of the audio channels to determine whether the configuration of the audio channels satisfies the request made by a user.

7. The method of claim 6, wherein splitting is further based on the one or more audio processing modes and the one or more audio stream categories assigned to the audio streams by the one or more applications, wherein the audio processing modes include one or more of raw, default, communication, media, speech, and notification, wherein the audio stream categories include one or more of movies, games, speeches, alerts, sound effects, game effects, and chats.

8. The method of claim 6, further comprising:
rejecting the configuration, if the configuration fails to satisfy the request; and
accepting the configuration, if the configuration satisfies the request, wherein the accepted configuration is confirmed and stored for future uses.

9. The method of claim 6, further comprising facilitating real-time monitoring and synchronization of the audio streams and the audio channels after splitting the audio streams.

10. The method of claim 6, wherein the computing device comprises a media device including one or more of a laptop computer, a monitor, a gaming device, a smart wearable device, a smartphone, a tablet computer, and a desktop computer, wherein the audio channels are associated with one or more of speaker devices and display devices, and wherein the computing device comprises one or more processors including a graphics processor and an application processor, wherein the one or more processors are co-located on a common semiconductor package.

11. A non-transitory computer-readable medium having stored thereon instructions which, when executed, cause a computing device to perform operations comprising:
receiving a request to split audio streams associated with audio channels in communication with the computing device serving as a host device, wherein the audio streams are generated by one or more applications;
selecting a split mode to facilitate splitting of the audio streams, wherein the audio channels are initialized based on the splitting of the audio streams;
splitting the audio streams based on the split mode such that the audio streams are continuously mapped to the audio channels to adjust for delays and fine tuning;
facilitating configuration of the initialized audio channels based on one or more of the split mode, one or more audio processing modes, and one or more audio stream categories; and
testing the configuration of the audio channels to determine whether the configuration of the audio channels satisfies the request made by a user.

12. The non-transitory computer-readable medium of claim 11, wherein splitting is further based on the one or more audio processing modes and the one or more audio stream categories assigned to the audio streams by the one or more applications, wherein the audio processing modes include one or more of raw, default, communication, media, speech, and notification, wherein the audio stream categories include one or more of movies, games, speeches, alerts, sound effects, game effects, and chats.

13. The non-transitory computer-readable medium of claim 11, wherein the operations further comprise:
rejecting the configuration, if the configuration fails to satisfy the request; and
accepting the configuration, if the configuration satisfies the request, wherein the accepted configuration is confirmed and stored for future uses.

14. The non-transitory computer-readable medium of claim 11, wherein the operations further comprise facilitating real-time monitoring and synchronization of the audio streams and the audio channels after splitting the audio streams, wherein the computing device comprises a media device including one or more of a laptop computer, a monitor, a gaming device, a smart wearable device, a smartphone, a tablet computer, and a desktop computer, wherein the audio channels are associated with one or more of speaker devices and display devices, and wherein the computing device comprises one or more processors including a graphics processor and an application processor, wherein the one or more processors are co-located on a common semiconductor package.

* * * * *